(12) United States Patent
Maekawa et al.

(10) Patent No.: US 6,753,084 B2
(45) Date of Patent: Jun. 22, 2004

(54) SPINDLE-SHAPED MAGNETIC ALLOY PARTICLES FOR MAGNETIC RECORDING, AND MAGNETIC RECORDING MEDIUM

(75) Inventors: Masaaki Maekawa, Hiroshima (JP); Haruki Kurokawa, Hiroshima (JP); Kenji Okinaka, Ube (JP); Akinori Yamamoto, Hatsukaichi (JP); Yasutaka Ota, Onoda (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 125 days.

(21) Appl. No.: 10/022,801

(22) Filed: Dec. 20, 2001

(65) Prior Publication Data

US 2002/0155323 A1 Oct. 24, 2002

(30) Foreign Application Priority Data

Dec. 27, 2000 (JP) ........................................ 2000-399312

(51) Int. Cl.$^7$ ................................................ B32B 5/16
(52) U.S. Cl. ................................ 428/402; 428/694 BA; 428/900
(58) Field of Search .......................... 428/402, 694 BA, 428/900

(56) References Cited

U.S. PATENT DOCUMENTS

| | | | |
|---|---|---|---|
| 5,580,399 A | | 12/1996 | Tamai et al. |
| 5,735,969 A | * | 4/1998 | Lown et al. |
| 5,989,516 A | * | 11/1999 | Okinaka et al. |
| 6,048,412 A | * | 4/2000 | Kurokawa et al. |
| 6,183,868 B1 | * | 2/2001 | Kurokawa et al. |
| 6,391,450 B1 | * | 5/2002 | Okinaka et al. |
| 6,506,486 B1 | * | 1/2003 | Araki et al. |
| 6,544,673 B1 | * | 4/2003 | Okinaka et al. |

FOREIGN PATENT DOCUMENTS

| | | |
|---|---|---|
| EP | 0 466 338 A1 | 1/1992 |
| EP | 0 717 396 | 6/1996 |
| EP | 0 940 369 A2 | 9/1999 |
| EP | 1 061 511 A2 | 12/2000 |

OTHER PUBLICATIONS

Nishio, "Magnetic Aftereffects of Co–γ–Fe2O3 Fine Particles", Journal of the Magnetics Society of Japan. vol. 15 Supplement, No. S2 (1991).

Nishio, "Magnetic Aftereffects of Particles for High–Density Magnetic Recording Media". Journal of the Magnetics Society of Japan vol. 13, Supplement. No. S1 (1989).

Nishio. "Magnetic Viscosity in High–Performance Permanent Magnets and High–Density Magnetic Recording Media", vol. 22. No. 1. 1998. pp. 3–11.

* cited by examiner

Primary Examiner—H. Thi Le
(74) Attorney, Agent, or Firm—Nixon & Vanderhye P.C.

(57) ABSTRACT

Spindle-shaped magnetic alloy particles containing Fe and Co as main components of the present invention have a cobalt content of 20 to 50 atm % (calculated as Co) based on whole Fe; an average major axis diameter (L) of 0.03 to 0.10 μm; a coercive force value of 159.2 to 238.7 kA/m (2,000 to 3,000 Oe); a crystallite size of 100 to 160 Å; and an activation volume ($V_{act}$) of 0.01 to 0.07E-4 μm$^3$. A high-density magnetic recording medium produced by using such spindle-shaped magnetic alloy particles containing Fe and Co as main components, have an excellent output characteristics in a short wavelength region, a considerably reduced noise and an excellent storage stability.

15 Claims, No Drawings

SPINDLE-SHAPED MAGNETIC ALLOY PARTICLES FOR MAGNETIC RECORDING, AND MAGNETIC RECORDING MEDIUM

BACKGROUND OF THE INVENTION

The present invention relates to spindle-shaped magnetic alloy particles for magnetic recording, and a magnetic recording medium, and more particularly, to a high-density magnetic recording medium having an excellent output characteristics in a short wavelength region, a considerably reduced noise and an excellent storage stability; spindle-shaped magnetic alloy particles containing Fe and Co as main components, which are contained in the magnetic recording medium and are fine particles exhibiting not only a high coercive force, an adequate saturation magnetization value and an excellent oxidation stability in spite of a small crystallite size, but also a small rotational hysteresis integral value when formed into a coating film; and a high-density magnetic recording medium having an excellent output characteristics in a short wavelength region, a considerably reduced noise and an excellent storage stability.

With recent development of miniaturized and lightweight magnetic recording and reproducing apparatuses for use in audio, video and computer as well as increase in recording time and memory capacity thereof, magnetic recording media used therefor have increasingly required to have a high performance and a high recording density.

In particular, in the field of computer tapes, with rapid development of high performance computers, it has been strongly required to enhance a memory capacity thereof for achieving miniaturization and large capacity thereof.

Namely, the magnetic recording media have been required to exhibit a high recording density, high output characteristics and improved frequency characteristics, especially excellent output characteristics in a short wavelength region. For this purpose, it has been required to reduce a noise of the magnetic recording media, and enhance a coercive force Hc thereof.

Also, in recent magneto resistive-type head as a reproduction head for computer tapes instead of conventional induction-type magnetic heads. Since the MR head can readily produce a considerably high reproduction output as compared to the conventional induction-type magnetic heads, it has been expected to further improve a high-density recording performance of the magnetic recording media.

In particular, the MR head is free from impedance noise due to use of induction coil and, therefore, is capable of reducing a system noise such as device noise to a large extent, resulting in reduced noise and high C/N ratio of the magnetic recording media. Accordingly, it has been strongly required to further reduce the noise of the magnetic recording media as compared to conventional ones.

In addition, in order to achieve a high-density recording, especially reduce a recording wavelength, it has been required to narrow a magnetization transition region and sharpen a digital signal reproduction waveform from the standpoints of high output and low noise. For this purpose, it has also been desired to approach the magnetization reversal to coherent rotation relative to a magnetic field and lessen the width of magnetization reversal.

These properties of the magnetic recording media have a close relation to magnetic particles used therein. In recent years, magnetic alloy particles containing iron as a main component have been noticed, because such particles can show a high coercive force and a large saturation magnetization ($\sigma s$) as compared to those of conventional magnetic iron oxide particles. Further, magnetic alloy particles containing iron as a main component have been already used as magnetic particles for external memory devices such as computer tapes, e.g., DDS, DLT and TRAVAN.

Therefore, it has been strongly required to further improve properties of the magnetic alloy particles containing iron as a main component in order to satisfy the above requirements for magnetic recording media.

Specifically, in order to obtain magnetic recording media having a high coercive force, a less noise and a small width of magnetization reversal, it has been strongly required to provide fine magnetic alloy particles containing iron as a main component which are fine particles and are capable of not only exhibiting a small crystallite size, a high coercive force and an excellent dispersibility, but also having a magnetization reversal mechanism for ensuring substantially coherent rotation of the magnetization relative to a magnetic field.

As to the reduction in particle size of the magnetic alloy particles, in Japanese Patent Application Laid-Open (KOKAI) No. 2000-251243, it is described that ". . . When the size of a magnetic particles used becomes as large as compatible with a length of a recording region for signals, a clear magnetization transition region is no longer available, so that it becomes substantially impossible to record signals thereon. For this reason, it has been longtime demanded to provide the fine particles for achieving high-density recording upon use . . . " Thus, in order to obtain magnetic recording media having a high output characteristics in a short wavelength region, and a less noise, it is required to reduce the particle size of the magnetic alloy particles for obtaining fine particles, i.e., reduce the major axis diameter thereof.

Also, as to the crystallite size of the magnetic alloy particles, in Japanese Patent Application Laid-Open (KOKAI) No. 7-126704 (1995), it is described that ". . . In order to reduce the noise level due to magnetic recording media, it is also effective to reduce the X-ray-measured size to as low a level as possible . . . ". Thus, in order to obtain magnetic recording media having a less noise, the magnetic alloy particles containing iron as a main component have been strongly required to have a smaller crystallite size $D_{110}$.

In addition, in order to further reduce the noise of the magnetic recording media, it is insufficient to lessen merely the major axis diameter and crystallite size of the magnetic alloy particles. For this purpose, it has been strongly required to clearly determine what factors should be concerned with the noise to be reduced.

In particular, there has been recently studied the activation volume obtained by measuring a time decay of magnetization due to thermal fluctuation and magnetic after-effect. On the basis of such studies, the reduction in noise of magnetic recording media has been attempted by optimizing the activation volume.

Also, it has been required to approach a magnetization reversal mode of the magnetic alloy particles to coherent rotation.

However, it is very difficult to obtain magnetic alloy particles containing Fe and Co as main components, which are fine particles, and exhibit a small crystallite size, a high coercive force and a magnetization reversal mode close to coherent rotation, because of its production process.

The above fact is explained below.

That is, the magnetic alloy particles containing iron as a main component have been generally produced by heat-reducing in a reducing gas atmosphere (i) spindle-shaped goethite particles obtained by passing an oxygen-containing gas such as air through an aqueous solution containing an iron-containing precipitate produced by reacting an aqueous ferrous salt solution with an aqueous alkali solution to conduct an oxidation reaction thereof, (ii) spindle-shaped hematite particles obtained by heat-dehydrating the spindle-shaped goethite particles, or (iii) spindle-shaped particles obtained by incorporating different elements other than iron into these particles.

As to the relationship between crystallite size and coercive force, in Japanese Patent Application Laid-Open (KOKAI) No. 4-61302 (1992), it is described that "... There is a tendency that the smaller the crystallite size, the lower the coercive force. Therefore, . . . it has been strongly required to provide magnetic particles exhibiting a small crystallite size while maintaining as high a coercive force as possible . . . ". Thus, in the case of the spindle-shaped magnetic alloy particles, the crystallite size and the coercive force thereof have a reverse interrelation to each other. Therefore, it is extremely difficult to obtain magnetic alloy particles satisfying both a small crystallite size and a high coercive force.

In addition, in the consideration of good oxidation stability of the magnetic alloy particles, it is necessary to fully enhance the reduction percentage of the particles by increasing a heat-reducing temperature to as high a value as possible. However, when the heat-reducing temperature is elevated, the starting particles tend to suffer from shape destruction, resulting in deteriorated coercive force of the obtained magnetic alloy particles. Further, since the heat-reduction conditions such as atmosphere and temperature are very severe, the obtained spindle-shaped magnetic alloy particles tend to suffer from sintering within or between the particles.

In recent years, the particle size of magnetic alloy particles is more and more reduced in order to impart a high coercive force thereto. For this reason, the particle size of the starting particles is also reduced. However, in the case where the starting particles are fine particles having a particle size of not more than 0.15 $\mu$m, there is such a remarkable tendency that the particles suffer from shape destruction upon the heat-reduction process. Such shape-destroyed magnetic alloy particles cannot exhibit a high coercive force because of shape anisotropy thereof, and are deteriorated in size distribution. Further, the reduction in particle size of the magnetic alloy particles causes a rapid deterioration in oxidation stability thereof. In addition, when such fine particles are used for the production of magnetic recording media, the dispersibility of the fine particles in vehicles tends to be deteriorated because of the increase in intermolecular force between the particles or the increase in magnetic cohesive force therebetween when kneaded with a binder and dispersed in vehicles. As a result, a magnetic coating film produced from such fine particles is deteriorated in squareness, so that it becomes difficult to obtain magnetic recording media exhibiting an excellent SFD.

Also, although the magnetization reversal mode of the magnetic alloy particles can approach to coherent rotation by enhancing a single crystal growth thereof, there arises a problem that the enhanced single crystal growth also causes increase in crystallite size of the magnetic alloy particles. Therefore, it has been difficult to achieve both the requirements of approaching the magnetization reversal mode of the magnetic alloy particles to coherent rotation, and lessening the crystallite size thereof.

The method of obtaining magnetic recording media exhibiting a high output characteristics and a low noise by improving properties of the magnetic alloy particles has been described in Japanese Patent Application Laid-Open (KOKAI) Nos. 8-171718 (1996), 9-22522 (1997), 9-22523 (1997), 9-106535 (1997) and 10-302243 (1998), etc.

At present, it has been strongly demanded to provide spindle-shaped magnetic alloy particles not only having a high coercive force and an adequate saturation magnetization value in spite of a crystallite size as small as especially not more than 160 Å, but also exhibiting a magnetization reversal mode close to coherent rotation. However, such magnetic alloy particles fully satisfying the aimed properties have not been obtained.

That is, in Japanese Patent Application Laid-Open (KOKAI) No. 8-171718 (1996), although the ratio of coercive force Hc to an anisotropy field HK of a magnetic recording medium is specified therein, it is still insufficient to reduce a noise. In addition, properties of magnetic alloy particles required for reducing the noise, have not been fully studied.

In Japanese Patent Application Laid-Open (KOKAI) Nos. 9-22522 (1997) and 9-22523 (1997), the number of crystallites of magnetic alloy particles is specified, and in Japanese Patent Application Laid-Open (KOKAI) No. 9-106535 (1997), there are specifically described the number of crystallites and crystallinity of magnetic alloy particles as well as the magnetization reversal mode. However, these specified properties of the magnetic alloy particles cannot satisfy the requirement for reducing the noise, and are still insufficient from the standpoint of bringing the magnetization reversal mode into coherent rotation.

Also, in Japanese Patent Application Laid-Open (KOKAI) No. 10-302243 (1998), there is specifically described a magnetization reversal volume of magnetic recording media which is obtained from a frequency-dependence of the coercive force. The specified property is still insufficient to fully reduce the noise. In addition, there are no descriptions concerning properties of magnetic alloy particles required for reducing the noise.

In "Technical Report of the Institute of Electronics Information and Communication Engineers", MR97-22, pp. 29 to 34 (1997-07), there is described the relationship between activation volume and actual volume of magnetic recording media using magnetic alloy particles. However, since the magnetic recording media have a large activation volume, it is not suitable to fully reduce the noise. In addition, any properties of magnetic alloy particles required for reducing the noise are not fully studied.

Also, in "Journal of Magnetism and Magnetic Materials", 193, pp. 314 to 317 (1999), there is described the activation volume of magnetic alloy particles. However, since the magnetic alloy particles have a large crystallite size, it is not possible to fully reduce the noise.

As a result of the present inventors' earnest studies for solving the above problems, it has been found that by heating spindle-shaped goethite particles containing cobalt in an amount of 20 to 50 atm % (calculated as Co) based on whole Fe and having an average major axis diameter of 0.05 to 0.15 $\mu$m, or spindle-shaped hematite particles obtained by heat-dehydrating the above spindle-shaped goethite particles as starting particles, to a temperature of 300 to 600° C. in an inert gas atmosphere, and after replacing the inert gas atmosphere with a reducing gas atmosphere, heat-reducing the above heat-treated particles at a temperature of 300 to 600° C., thereby obtaining spindle-shaped magnetic alloy particles;

subjecting the obtained spindle-shaped magnetic alloy particles to surface oxidation at a temperature of 80 to 200° C. in an oxygen-containing inert gas atmosphere, thereby controlling the saturation magnetization value of the spindle-shaped magnetic alloy particles to 85 to 135 $Am^2/kg$;

heating the obtained spindle-shaped magnetic alloy particles to a temperature higher by not less than 50° C. than the above heat-reducing temperature which are between 400 to 700° C., in an inert gas atmosphere, and after replacing the inert gas atmosphere with a reducing gas atmosphere, heat-reducing the obtained particles again at a temperature of 400 to 700° C.; and subjecting the obtained spindle-shaped magnetic alloy particles again to surface oxidation at a temperature of 40 to 160° C. in an inert gas atmosphere containing water vapor in an amount of 5 to 10 $g/cm^3$ and oxygen, a magnetic recording medium produced using the thus obtained spindle-shaped magnetic alloy particles exhibits not only an excellent output characteristics in a short wavelength region and a considerably reduced noise, but also an excellent storage stability. The present invention has been attained on the basis of this finding.

SUMMARY OF THE INVENTION

An object of the present invention is to provide spindle-shaped magnetic alloy particles which are fine particles, and exhibit not only a high coercive force and an adequate saturation magnetization vale in spite of a small crystallite size, but also a small rotational hysteresis integral value.

Another object of the present invention is to provide a high-density magnetic recording medium capable of exhibiting not only an excellent output characteristics in a short wavelength region and a considerably reduced noise, but also an excellent storage stability.

To accomplish the aims, in a first aspect of the present invention, there are provided spindle-shaped magnetic alloy particles containing Fe and Co as main components, having a cobalt content of 20 to 50 atm %, calculated as Co, based on whole Fe; an average major axis diameter (L) of 0.03 to 0.10 μm; a coercive force value of 159.2 to 238.7 kA/m (2,000 to 3,000 Oe); a crystallite size of 100 to 160 Å; and an activation volume ($V_{act}$) of 0.01 to 0.07E-4 $μm^3$.

In a second aspect of the present invention, there are provided spindle-shaped magnetic alloy particles containing Fe and Co as main components, having a cobalt content of 20 to 50 atm %, calculated as Co, based on whole Fe; an average major axis diameter (L) of 0.03 to 0.08 μm; an average minor axis diameter of 0.008 to 0.020 μm; an aspect ratio (average major axis diameter/average minor axis diameter) of 3:1 to 8:1; a coercive force value of 159.2 to 238.7 kA/m (2,000 to 3,000 Oe); a crystallite size of 110 to 160 Å; and an activation volume ($V_{act}$) of 0.01 to 0.07E-4 $μm^3$.

In a third aspect of the present invention, there are provided spindle-shaped magnetic alloy particles containing Fe and Co as main components, having a cobalt content of 20 to 50 atm %, calculated as Co, based on whole Fe; an average major axis diameter (L) of 0.03 to 0.10 μm; a coercive force value of 159.2 to 238.7 kA/m (2,000 to 3,000 Oe); a crystallite size of 100 to 160 Å; an activation volume ($V_{act}$) of 0.01 to 0.07E-4 $μm^3$; and a rotational hysteresis integral value (Rh) of not more than 1.0.

In a fourth aspect of the present invention, there are provided spindle-shaped magnetic alloy particles containing Fe and Co as main components, having a cobalt content of 20 to 50 atm %, calculated as Co, based on whole Fe; an average major axis diameter (L) of 0.03 to 0.10 μm; a coercive force value of 159.2 to 238.7 kA/m (2,000 to 3,000 Oe); a saturation magnetization value of 100 to 150 $Am^2/kg$; a crystallite size of 100 to 160 Å; an activation volume ($V_{act}$) of 0.01 to 0.07E-4 $μm^3$; and a rotational hysteresis integral value (Rh) of not more than 1.0.

In a fifth aspect of the present invention, there is provided a magnetic recording medium comprising a non-magnetic substrate, and a magnetic layer formed on the non-magnetic substrate, which comprises a binder resin and the spindle-shaped magnetic alloy particles containing Fe and Co as main components, which have a cobalt content of 20 to 50 atm %, calculated as Co, based on whole Fe; an average major axis diameter (L) of 0.03 to 0.10 μm; a coercive force value of 159.2 to 238.7 kA/m (2,000 to 3,000 Oe); a crystallite size of 100 to 160 Å; and an activation volume ($V_{act}$) of 0.01 to 0.07E-4 $μm^3$.

In a sixth aspect of the present invention, there is provided a magnetic recording medium comprising a non-magnetic substrate, and a magnetic layer formed on the non-magnetic substrate, which comprises a binder resin and the spindle-shaped magnetic alloy particles containing Fe and Co as main components, which have a cobalt content of 20 to 50 atm %, calculated as Co, based on whole Fe; an average major axis diameter (L) of 0.03 to 0.10 μm; a coercive force value of 159.2 to 238.7 kA/m (2,000 to 3,000 Oe); a crystallite size of 100 to 160 Å; and an activation volume ($V_{act}$) of 0.01 to 0.07E-4 $μm^3$, the magnetic recording medium having a coercive force Hc of 159.2 to 238.7 kA/m (2,000 to 3,000 Oe); a squareness (Br/Bm) of not less than 0.82; an orientation degree of not less than 2.0; an oxidation stability ΔBm of less than 8%; and a surface roughness Ra of not more than 8 nm.

In a seventh aspect of the present invention, there is provided a magnetic recording medium comprising a non-magnetic substrate, and a magnetic layer formed on the non-magnetic substrate, which comprises a binder resin and the spindle-shaped magnetic alloy particles containing Fe and Co as main components, which have a cobalt content of 20 to 50 atm %, calculated as Co, based on whole Fe; an average major axis diameter (L) of 0.03 to 0.10 μm; a coercive force value of 159.2 to 238.7 kA/m (2,000 to 3,000 Oe); a crystallite size of 100 to 160 Å; and an activation volume ($V_{act}$) of 0.01 to 0.07E-4 $μm^3$, said magnetic recording medium having a coercive force Hc of 159.2 to 238.7 kA/m (2,000 to 3,000 Oe); a squareness (Br/Bm) of not less than 0.82; an orientation degree of not less than 2.0; an oxidation stability ΔBm of less than 8%; and a surface roughness Ra of not more than 8 nm.

In an eighth aspect of the present invention, there is provided spindle-shaped magnetic alloy particles containing Fe and Co as main components, having a cobalt content of 20 to 45 atm %, calculated as Co, based on whole Fe; an average major axis diameter (L) of 0.03 to 0.08 μm; an average minor axis diameter of 0.008 to 0.020 μm; an aspect ratio (average major axis diameter/average minor axis diameter) of 3:1 to 8:1; a coercive force value of 159.2 to 238.7 kA/m (2,000 to 3,000 Oe); a crystallite size of 110 to 160 Å; and an activation volume ($V_{act}$) of 0.01 to 0.07E-4 $μm^3$, the magnetic recording medium having a coercive force Hc of 159.2 to 238.7 kA/m (2,000 to 3,000 Oe); a squareness (Br/Bm) of not less than 0.82; an orientation degree of not less than 2.0; an oxidation stability ΔBm of less than 8%; and a surface roughness Ra of not more than 8 nm.

In a ninth aspect of the present invention, there is provided spindle-shaped magnetic alloy particles containing Fe and Co as main components, having a cobalt content of 20 to 50 atm %, calculated as Co, based on whole Fe; an average major axis diameter (L) of 0.03 to 0.10 μm; an average minor axis diameter of 0.008 to 0.020 μm; an aspect ratio (average major axis diameter/average minor axis diameter) of 3:1 to 8:1; a coercive force value of 159.2 to 238.7 kA/m (2,000 to 3,000 Oe); a crystallite size of 100 to 160 Å; an activation volume ($V_{act}$) of 0.01 to 0.07E-4 μm³; and a rotational hysteresis integral value (Rh) of not more than 1.0, the magnetic recording medium having a coercive force Hc of 159.2 to 238.7 kA/m (2,000 to 3,000 Oe); a squareness (Br/Bm) of not less than 0.82; an orientation degree of not less than 2.0; an oxidation stability ΔBm of less than 8%; and a surface roughness Ra of not more than 8 nm.

In a tenth aspect of the present invention, there is provided spindle-shaped magnetic alloy particles containing Fe and Co as main components, having a cobalt content of 20 to 50 atm %, calculated as Co, based on whole Fe; an average major axis diameter (L) of 0.03 to 0.10 μm; an average minor axis diameter of 0.008 to 0.020 μm; an aspect ratio (average major axis diameter/average minor axis diameter) of 3:1 to 8:1; a coercive force value of 159.2 to 238.7 kA/m (2,000 to 3,000 Oe); a saturation magnetization value of 100 to 150 Am²/kg; a crystallite size of 100 to 160 Å; an activation volume ($V_{act}$) of 0.01 to 0.07E-4 μm³; and a rotational hysteresis integral value (Rh) of not more than 1.0, the magnetic recording medium having a coercive force Hc of 159.2 to 238.7 kA/m (2,000 to 3,000 Oe); a squareness (Br/Bm) of not less than 0.82; an orientation degree of not less than 2.0; an oxidation stability ΔBm of less than 8%; and a surface roughness Ra of not more than 8 nm.

DETAILED DESCRIPTION OF THE INVENTION

The present invention will be described in detail below.

First, the spindle-shaped magnetic alloy particles of the present invention are described.

The spindle-shaped magnetic alloy particles of the present invention contain cobalt in an amount of usually 20 to 50 atm %, preferably 20 to 45 atm % (calculated as Co) based on whole Fe. When the cobalt content is less than 20 atm %, the obtained particles cannot be sufficiently improved in oxidation stability, and can not show a high coercive force. When the cobalt content is more than 50 atm %, the obtained particles are deteriorated in saturation magnetization value and coercive force. In addition, the used of a high cobalt content is also undesirable from economical viewpoint.

The spindle-shaped magnetic alloy particles of the present invention have an average major axis diameter of usually 0.03 to 0.10 μm, preferably 0.03 to 0.095 μm, more preferably 0.03 to 0.08 μm. When the average major axis diameter is less than 0.03 μm, the obtained spindle-shaped magnetic alloy particles suffer from considerable deterioration in saturation magnetization value and oxidation stability, and simultaneously can not show a high coercive force. Further, since the time decay in recording quality due to thermal fluctuation is not ignorable, the obtained particles having such a small average major axis diameter cannot be used as recording media. When the average major axis diameter is more than 0.10 μm, such spindle-shaped magnetic alloy particles can not fully exhibit the aimed high output characteristics in a short wavelength region and a low noise, and are also deteriorated in coercive force.

The spindle-shaped magnetic alloy particles of the present invention have an average minor axis diameter of usually 0.008 to 0.020 μm. When the average minor axis diameter is more than 0.020 μm, the obtained spindle-shaped magnetic alloy particles may be deterioration in coercive force and anisotropy field. Further, it may become difficult to obtain spindle-shaped magnetic alloy particles satisfying all requirements for crystallite size, activation volume and rotational hysteresis integral vale. When the average minor axis diameter is less than 0.008 μm, the obtained spindle-shaped magnetic alloy particles may suffer from considerable deterioration in saturation magnetization value and oxidation stability, and it may be difficult show a high coercive force. Further, since the time decay in recording quality to thermal fluctuation is not ignorable, the obtained particles having such a small average minor axis diameter may not be used as recording media.

The spindle-shaped magnetic alloy particles of the present invention have an aspect ratio (average major axis diameter/average minor axis diameter) of preferably 3:1 to 8:1.

The spindle-shaped magnetic alloy particles of the present invention have a crystallite size $D_{110}$ of usually 100 to 160 Å, preferably 100 to 155 Å. When the crystallite size $D_{110}$ is more than 160 Å, the aimed reduction in noise in a short wavelength region may not be sufficiently achieved. When the crystallite size $D_{110}$ is less than 100 Å, the obtained spindle-shaped magnetic alloy particles may suffer from considerable deterioration in saturation magnetization value and oxidation stability, and simultaneously can not show a high coercive force. Further, since the time decay in recording quality due to thermal fluctuation is not ignorable, the obtained particles having such a small crystallite size may not be used as recording media.

The spindle-shaped magnetic alloy particles of the present invention have an activation volume ($V_{act}$) of usually 0.01 to 0.07E-4 μm³, preferably 0.015 to 0.07E-4 μm³. When the activation volume is more than 0.07E-4 μm³, the aimed reduction in noise in a short wavelength region may not be sufficiently achieved. When the activation volume is less than 0.01E-4 μm³, the obtained spindle-shaped magnetic alloy particles may suffer from considerable deterioration in saturation magnetization value and oxidation stability, and simultaneously can not show a high coercive force. Further, since the time decay in recording quality due to thermal fluctuation is not ignorable, the obtained particles having such a small activation volume may not be used as recording media.

The spindle-shaped magnetic alloy particles of the present invention have a rotational hysteresis integral (Rh) value of usually not more than 1.0, preferably not more than 0.95. When the rotational hysteresis integral (Rh) value is more than 1.0, the high output characteristics in a short wavelength region and the reduction in noise may not be achieved.

In addition, the spindle-shaped magnetic alloy particles of the present invention have a BET specific surface area value of preferably 40 to 75 m²/g, more preferably 45 to 75 m²/g. When the BET specific surface area is more than 75 m²/g, it may be difficult to disperse the obtained spindle-shaped magnetic alloy particles in vehicles upon producing a coating material therefrom. When the BET specific surface area is less than 40 m²/g, it is difficult to obtain spindle-shaped magnetic alloy particles capable of satisfying all requirements for crystallite size, activation volume and major axis diameter.

The spindle-shaped magnetic alloy particles of the present invention have a coercive force Hc of usually 159.2 to 238.7 kA/m (2,000 to 3,000 Oe), preferably 167.1 to 222.8 kA/m (2,100 to 2,800 Oe). When the coercive force is more than 238.7 kA/m, the recording head is saturated, thereby failing to obtain the aimed high output characteristics in a short wavelength region. When the coercive force is less than 159.2 kA/m, it is difficult to obtain a fully high output characteristics in a short wavelength region.

The spindle-shaped magnetic alloy particles of the present invention preferably have a saturation magnetization value ($\sigma s$) of usually 100 to 150 $Am^2$/kg (100 to 150 emu/g), preferably 100 to 140 $Am^2$/kg (100 to 140 emu/g). When the saturation magnetization value is more than 150 $Am^2$/kg, the increase in noise may be caused. In particular, when an MR head is used as a reproduction head, excessive residual magnetization may be produced, resulting in unnecessary increase in noise and, therefore, deterioration in C/N ratio. When the saturation magnetization value is less than 100 $Am^2$/kg, the obtained magnetic alloy particles may undergo problems such as deteriorated coercive force and wide coercive force distribution.

The spindle-shaped magnetic alloy particles of the present invention have a squareness ($\sigma r/\sigma s$) of 0.52 to 0.55.

The spindle-shaped magnetic alloy particles of the present invention have an anisotropy field (Hk) of usually 477.5 to 636.6 kA/m (6,000 to 8,000 Oe), preferably 517.3 to 636.6 (6,500 to 8,000 Oe). It is difficult to industrially produce such magnetic alloy particles having an anisotropy field (Hk) of more than 636.6 kA/m (8,000 Oe). When the anisotropy field (Hk) is less than 477.5 kA/m (6,000 Oe), it is difficult to attain the aimed high output characteristics in a short wavelength region.

The spindle-shaped magnetic alloy particles of the present invention have an oxidation stability ($\Delta \sigma s$) of saturation magnetization of preferably not more than 15%, more preferably not more than 13%, still more preferably not more than 10%.

Next, the process for producing the magnetic recording medium according to the present invention is described.

The magnetic recording medium of the present invention comprises a non-magnetic substrate, and a magnetic recording layer formed on the non-magnetic substrate, which comprises the spindle-shaped magnetic alloy particles of the present invention and a binder resin.

As the non-magnetic substrate, there may be used those presently used in ordinary magnetic recording media, e.g., films of synthetic resins such as polyethylene terephthalate, polyethylene, polypropylene, polycarbonates, polyethylene naphthalate, polyamides, polyamideimides and polyimides, foils and plates of metals such as aluminum and stainless steel, and various papers. The thickness of the non-magnetic substrate may be varied depending upon materials thereof, and is preferably 1.0 to 300 μm, more preferably 2.0 to 50 μm.

More specifically, in the case of magnetic discs, a non-magnetic substrate thereof may be usually made of polyethylene terephthalate, and has a thickness of usually 50 to 300 μm. In the case of magnetic tapes, a non-magnetic substrate thereof may be made of polyethylene terephthalate, polyethylene naphthalate, polyamide or the like; and the polyethylene terephthalate substrate has a thickness of usually 3 to 100 μm; the polyethylene naphthalate substrate has a thickness of usually 3 to 50 μm, and the polyamide substrate has a thickness of usually 2 to 10 μm.

As the binder, there may be used those presently used for the production of ordinary magnetic recording media, e.g., vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivatives such as nitrocellulose, polyester resin, synthetic rubber-based resin such as polybutadiene, epoxy resin, polyamide resin, polyisocyanate, electron beam-curable acrylic urethane resin, or mixtures thereof.

Also, the binder resin may contain polar groups such as —OH, —COOH, —$SO_3M$, —$OPO_2M_2$ and —$NH_2$, wherein M represents hydrogen, Na or K.

The magnetic recording layer formed on the non-magnetic substrate has a thickness of usually 0.01 to 5.0 μm. When the thickness is less than 0.01 μm, it may tend to be difficult to form a uniform magnetic recording layer because of coating unevenness or the like. When the thickness is more than 5.0 μm, it may tend to be difficult to obtain the aimed electromagnetic performance because of adverse influence of demagnetizing field.

The amount of the spindle-shaped magnetic alloy particles contained in the magnetic recording layer is usually 5 to 2,000 parts by weight based on 100 parts by weight of the binder resin.

Meanwhile, the magnetic recording layer may further contain, if required, known additives ordinarily used in magnetic recording media such as lubricants, abrasives, anti-static agents or the like in an amount of usually 0.1 to 50 parts by weight based on 100 parts by weight of the binder resin.

The magnetic recording medium obtained using the spindle-shaped magnetic alloy particles according to the present invention exhibits a coercive force Hc of usually 159.2 to 238.7 kA/m (2,000 to 3,000 Oe); a squareness (Br/Bm) of usually not less than 0.82, preferably not less than 0.85; an SFD of usually not more than 0.60, preferably not more than 0.50, more preferably not more than 0.45; an orientation degree of usually not less than 2.0, preferably not less than 2.3; an oxidation stability ΔBm of usually less than 8%, preferably less than 5%; and a surface roughness Ra of usually not more than 8 nm, preferably not more than 5 nm.

In the magnetic recording medium of the present invention, a non-magnetic undercoat layer containing non-magnetic particles and a binder resin may be disposed between the non-magnetic substrate and the magnetic recording layer.

As the non-magnetic particles for the non-magnetic undercoat layer, there may be used non-magnetic inorganic particles ordinarily used in a non-magnetic undercoat layer of magnetic recording media. Specific examples of the non-magnetic particles may include particles of hematite, iron oxide hydroxide, titanium oxide, zinc oxide, tin oxide, tungsten oxide, silicon dioxide, α-alumina, β-alumina, γ-alumina, chromium oxide, cerium oxide, silicon carbide, titanium carbide, silicon nitride, boron nitride, calcium carbonate, barium carbonate, magnesium carbonate, strontium carbonate, calcium sulfate, barium sulfate, molybdenum disulfide, barium titanate or the like. These non-magnetic particles may be used alone or in combination of any two or more thereof. Among these non-magnetic particles, particles of hematite, iron oxide hydroxide and titanium oxide, etc., are preferred.

Upon the production of a non-magnetic coating composition, in order to improve a dispersibility thereof in vehicles, the surface of the non-magnetic particles may be coated, if required, with hydroxides of aluminum, oxides of aluminum, hydroxides of silicon, oxides of silicon or the like. In addition, in order to improve properties of the obtained magnetic recording medium such as light transmittance, surface resistivity, mechanical strength, surface smoothness, durability or the like, various elements such as Al, Ti, Zr, Mn, Sn, Sb, etc., may be incorporated into the non-magnetic particles according to requirements.

The non-magnetic particles may have various shapes, and may include, for example, granular particles such as spherical particles, granulated particles, octahedral particles, hexahedral particles and polyhedral particles; acicular particles such as needle-like particles, spindle-shaped particles and rice ball-shaped particles; plate-shaped particles; or the like. In the consideration of good surface smoothness of the obtained magnetic recording medium, the non-magnetic particles preferably have an acicular particles.

The non-magnetic particles has an average particle diameter of usually 0.01 to 0.3 μm, and may be usually of granular, acicular or plate shape.

The acicular non-magnetic particles have an aspect ratio of usually 2:1 to 20:1, and the plate-shaped non-magnetic particles have a plate ratio (average plate surface diameter/average thickness) of usually 2:1 to 50:1.

The non-magnetic undercoat layer preferably has a thickness of 0.2 to 10.0 μm. When the thickness of the non-magnetic undercoat layer is less than 0.2 μm, it is difficult to improve the surface roughness of the non-magnetic substrate.

As the binder resin for the non-magnetic undercoat layer, there may be used those binder resins exemplified above for the production of the magnetic recording layer.

The amount of the non-magnetic particles contained in the non-magnetic undercoat layer is usually 5 to 2,000 parts by weight based on 100 parts by weight of the binder resin.

Meanwhile, the non-magnetic undercoat layer may further contain, if required, known additives ordinarily used in magnetic recording media such as lubricants, abrasives, anti-static agents or the like in an amount of usually 0.1 to 50 parts by weight based on 100 parts by weight of the binder resin.

In the present invention, the magnetic recording medium having the non-magnetic undercoat layer has the substantially same properties as those of the magnetic recording medium having no non-magnetic undercoat layer as described above. The magnetic recording medium having the non-magnetic undercoat layer according to the present invention can be readily surface-smoothened by calendaring treatment, and can be improved in running durability since a lubricant can be supplied from the non-magnetic undercoat layer.

Next, the process for producing the spindle-shaped magnetic alloy particles according to the present invention is described.

The spindle-shaped magnetic alloy particles of the present invention can be produced from spindle-shaped goethite particles containing cobalt in an amount of usually 20 to 50 atm % (calculated as Co) based on whole Fe and having an average major axis diameter of usually 0.05 to 0.15 μm, or spindle-shaped hematite particles obtained by heat-dehydrating the above spindle-shaped goethite particles as starting particles by the following method. That is, the spindle-shaped magnetic alloy particles of the present invention can be produced by conducting a first step of heating the above starting particles to a temperature of usually 300 to 600° C. in an inert gas atmosphere, and after replacing the inert gas atmosphere with a reducing gas atmosphere, heat-reducing the obtained particles at a temperature of usually 300 to 600° C., thereby obtaining spindle-shaped magnetic alloy particles; a second step of subjecting the spindle-shaped magnetic alloy particles obtained in the first step to surface oxidation at a temperature of usually 80 to 200° C. in an oxygen-containing inert gas atmosphere, thereby controlling the saturation magnetization value of the spindle-shaped magnetic alloy particles to 85 to 135 Am$^2$/kg; a third step of heating the spindle-shaped magnetic alloy particles obtained in the second step to a temperature higher by not less than 50° C. than the heat-reducing temperature used in the first step, which are between usually 400 to 700° C., in an inert gas atmosphere, and after replacing the inert gas atmosphere with a reducing gas atmosphere, heat-reducing the obtained particles again at a temperature of usually 400 to 700° C.; and a fourth step of subjecting the spindle-shaped magnetic alloy particles obtained in the third step again to surface oxidation at a temperature of usually 40 to 160° C. in an inert gas atmosphere containing water vapor in an amount of usually 5 to 10 g/m$^3$ and oxygen.

As described above, as the starting particles for spindle-shaped magnetic alloy particles of the present invention, there may be used spindle-shaped goethite particles containing cobalt in an amount of usually 20 to 50 atm % (calculated as Co) based on whole Fe and having an average major axis diameter of usually 0.05 to 0.15 μm, or spindle-shaped hematite particles obtained by heat-dehydrating the above spindle-shaped goethite particles, which contain cobalt in an amount of usually 20 to 50 atm % (calculated as Co) based on whole Fe and have an average major axis diameter of usually 0.05 to 0.13 μm.

The starting particles used in the present invention are spindle-shaped particles containing no dendritic particles and having an excellent size distribution.

The spindle-shaped goethite particles used as the starting particles may be produced from an aqueous ferrous salt solution and an aqueous alkali solution. As alkali contained in such an aqueous alkali solution, there may be used at least one selected from sodium carbonate solution, ammonium hydrogen carbonate solution and a mixed alkali solution composed of ammonium hydrogen carbonate and aqueous ammonia, or a mixed solution composed of the above-mentioned solution and sodium hydroxide solution. In the consideration of a less Na content and good magnetic properties of the obtained spindle-shaped goethite particles, it is preferred to use ammonium hydrogen carbonate and/or aqueous ammonia.

The surface of the spindle-shaped goethite particles used in the present invention may be coated with a Co compound, an Al compound or an anti-sintering agent.

As the anti-sintering agent, there may be used rare earth-containing compounds. Examples of rare earth elements contained in the anti-sintering agent may include scandium, yttrium, lanthanum, cerium, praseodymium, neodymium, samarium or the like. These rare earth elements may be used alone or in combination of two or more thereof. Among these rare earth elements, yttrium is preferred.

In the spindle-shaped goethite particles, in order to further enhance the anti-sintering effect, there may be used, if required, one or more compounds containing other elements selected from Si, B, Mg, Ba, Sr and the like. These compounds have not only the anti-sintering effect, but also a function of controlling the reducing velocity and, therefore, may be used in any suitable combination according to requirements.

In the consideration of anti-sintering effect and well-controlled reducing velocity, the spindle-shaped goethite particles used in the present invention preferably have an average minor axis diameter of 0.010 to 0.024 μm, an aluminum content of 5 to 15 atm % (calculated as Al) based on whole Fe, a rare earth content of 5 to 15 atm % (calculated as rare earth element) based on whole Fe, an aspect ratio of 4:1 to 8:1, and a BET specific surface area value of 100 to 250 m²/g.

Also, in the consideration of anti-sintering effect and well-controlled reducing velocity, the spindle-shaped hematite particles used in the present invention preferably have an average minor axis diameter of 0.010 to 0.023 μm, an aluminum content of 5 to 15 atm % (calculated as Al) based on whole Fe, a rare earth content of 5 to 15 atm % (calculated as rare earth element) based on whole Fe, an aspect ratio (average major axis diameter/average minor axis diameter) of 4:1 to 8:1, and a BET specific surface area value of 50 to 120 m²/g.

The spindle-shaped hematite particles are preferably produced by heat-dehydrating the spindle-shaped goethite particles at a temperature of 150 to 350° C. in an oxidative atmosphere, and then heat-treating the obtained particles at a temperature of from more than 450° C. to less than 700° C. in the same atmosphere.

Further, the thus heat-treated spindle-shaped hematite particles may be washed in order to remove impurity salts such as $Na_2SO_4$ derived from the production reaction of the spindle-shaped goethite particles therefrom. In this case, the removal of the impurities is preferably conducted by washing the spindle-shaped hematite particles under such a condition that the anti-sintering agent coated thereon is not eluted out.

In the present invention, when charging into a reducing apparatus, it is preferred to use as starting particles a granular powder having an average diameter of 1 to 5 mm.

As the suitable reducing apparatus used in the present invention, there may be exemplified such a reducing apparatus capable of forming a fixed bed of the particles. More specifically, there may be suitably used a stationary-type (batch-type) reducing apparatus or a movable-type (continuous-type) reducing apparatus capable of reducing the fixed bed formed on a belt while moving the belt.

In the present invention, the height of the fixed bed formed in the reducing apparatus is preferably not more than 30 cm. When the height of the fixed bed is more than 30 cm, there arises such a problem that the particles present in an upper portion of the fixed bed suffer from deterioration in coercive force by increase in water vapor partial pressure therein due to a remarkable reduction-accelerating effect by a large Co content and due to a rapid reduction reaction occurring at a lower portion of the fixed bed, resulting in deteriorated properties of the particles as a whole. In the consideration of industrial productivity, the height of the fixed bed formed in the reducing apparatus is more preferably 3 to 30 cm. Meanwhile, the production efficiency varies depending upon types of the reducing apparatus used, e.g., batch-type reducing apparatuses described in Japanese Patent Application Laid-Open (KOKAI) Nos. 54-62915 (1979) and 4-224609 (1992) or the like are different in production efficiency from continuous-type reducing apparatuses described in Japanese Patent Application Laid-Open (KOKAI) No. 6-93312 (1994) or the like. In the case of the batch-type fixed bed reducing apparatuses, the height of the fixed bed is preferably from more than 8 cm to 30 cm.

In the present invention, the atmosphere used during the heating period in the first and third steps for heating to the heat-reducing temperature is an inert gas atmosphere. As the inert gas for the inert gas atmosphere, there may be suitably used nitrogen gas, helium gas, argon gas or the like. Among these inert gases, nitrogen gas is preferred. When an atmosphere other than the inert gas atmosphere is used, the reduction is prematurely caused during the heating period at which the temperature is changed with the passage of time, so that the reduction temperature cannot be kept constant upon the production of the magnetic alloy particles, thereby failing to achieve a uniform crystallite growth in the particle and obtain particles having a high coercive force.

Meanwhile, the heating velocity in the first and third steps is not particularly restricted, and is preferably 2 to 100° C./minute.

The superficial velocity in the inert gas during the heating period of the first and third steps is not particularly restricted, and may be determined so as to prevent the granular starting powder from being scattered or broken.

Also, in the heating of the first and third steps, the method of switching from the inert gas atmosphere to the reducing gas atmosphere for the heat-reduction process, varies depending upon kinds of reducing apparatuses used. From industrial viewpoint, in the case of batch-type reducing apparatus, the switching between the atmospheres is preferably carried out stepwise while controlling an inner pressure of the reducing apparatus, and in the case of continuous-type reducing apparatus, it is preferred that the reducing zone is separated from the heating zone. In any case, the switching between the atmospheres is preferably completed for a short period of time, specifically within 10 minutes.

The atmosphere used in the heat-reducing process of the first and third steps is a reducing gas atmosphere. As the reducing gas, hydrogen may be suitably used.

In the present invention, the heat-reducing temperature used in the first step is usually 300 to 600° C., preferably 350 to 550° C. The heat-reducing temperature of the first step may be appropriately selected from the above-specified range depending upon kinds and amounts of compounds used for coating of the starting particles. When the heat-reducing temperature is less than 300° C., the reduction reaction may proceed very slowly in an industrially-unsuitable manner, so that the obtained spindle-shaped magnetic alloy particles may be deteriorated in saturation magnetization value. When the heat-reducing temperature is more than 600° C., the reduction reaction may proceed more rapidly, so that the obtained particles may suffer from shape destruction or sintering within or between the particles, resulting in deteriorated coercive force thereof.

In the present invention, the superficial velocity of the reducing gas used in the first step is preferably 40 to 150 cm/second. When the superficial velocity of the reducing gas used in the first step is less than 40 cm/second, the water vapor produced by reduction of the starting particles may be discharged only too slowly out of the reaction system, so that the particles present in the upper portion of the fixed bed may be deteriorated in coercive force and SFD, thereby failing to obtain particles having a high coercive force as a whole. When the superficial velocity of the reducing gas used in the first step is more than 150 cm/second, although the aimed spindle-shaped magnetic alloy particles are obtained, there may be caused problems such as need of a higher reducing temperature, thereby scattering and breaking of the granulated product or the like.

In the second step of the present invention, the particles obtained in the first step are subjected to surface oxidation in an oxygen-containing inert gas atmosphere. As the inert gas used in the oxygen-containing inert gas atmosphere, nitrogen gas, helium gas, argon gas or the like are preferred. Among these inert gases, nitrogen gas is more preferred. The oxygen content of the oxygen-containing inert gas atmosphere is preferably 0.1 to 5% by volume. It is preferred that the amount of oxygen is gradually increased until reaching the aimed content.

In the present invention, the reaction temperature used in the second step is usually 80 to 200° C., preferably 80 to 180° C. When the reaction temperature used in the second step is less than 80° C., it may be difficult to form a surface-oxidation layer having a sufficient thickness. When the reaction temperature used in the second step is more than 200° C., the particles may suffer from change in skeleton thereof, especially extremely swelled minor axis diameter thereof due to the production of a large amount of oxides, resulting in destruction of skeleton of the particles in the worse case.

The spindle-shaped magnetic alloy particles obtained after completion of the second step has a saturation magnetization value of usually 85 to 135 $Am^2/kg$ (85 to 135 emu/g), preferably 90 to 130 $Am^2/kg$ (90 to 130 emu/g), more preferably 100 to 130 $Am^2/kg$ (100 to 130 emu/g). When the saturation magnetization value is less than 85 $Am^2/kg$, the surface-oxidation layer is too thick, so that even though such particles are subjected to the heat-reduction process of the third step, it may be difficult to obtain spindle-shaped magnetic alloy particles having a high coercive force. When the saturation magnetization value is more than 135 $Am^2/kg$, the formation of the surface-oxidation layer is insufficient, thereby failing to form a dense surface-oxidation layer.

Meanwhile, when whole part of the particles is oxidized in the second step, the particles suffer from change in skeleton thereof, especially minor axis growth, i.e., extremely swelled minor axis diameter due to the production of a large amount of oxides. As a result, since the skeleton of such particles is already destroyed, it is not possible to improve a coercive force thereof even by reducing the particles again.

The heat-reducing temperature used in the third step of the present invention is higher by not less than 50° C. than the heat-reducing temperature used in the first step, and lies in the range of 400 to 700° C. When the heat-reducing temperature used in the third step is not higher by not less than 50° C. than the heat-reducing temperature used in the first step, or is less than 400° C., the reduction reaction may proceed very slowly in an industrially-unsuitable manner, so that it may be difficult to reduce the surface-oxidation layer formed in the second step, and to densify the particles as a whole. When the heat-reducing temperature used in the third step is more than 700° C., the obtained particles may tend to suffer from destruction of skeleton thereof or sintering within or between the particles, resulting in deterioration in coercive force thereof. The heat-reducing temperature used in the third step is preferably in the range of 450 to 650° C.

In the present invention, the superficial velocity of the reducing gas used in the third step is preferably 40 to 150 cm/second similarly to the first step.

In the third step, the particles obtained after the reduction process step may be subjected to annealing treatment. The annealing treatment may be conducted at a temperature of preferably 500 to 700° C. in a hydrogen gas atmosphere or an inert gas atmosphere such as especially nitrogen.

In the fourth step of the present invention, the particles are surface-oxidized in an inert gas atmosphere containing water vapor in an amount of 5 to 10 $g/m^3$ and oxygen. When the water vapor content in the inert gas atmosphere is less than 5 $g/m^3$, it may be difficult to form a dense and thin surface-oxidation layer, thereby failing to sufficiently improve a coercive force of the particles. When the water vapor content in the inert gas atmosphere is more than 10 $g/m^3$, the effect of addition of water vapor is already saturated and, therefore, the addition of such a large amount of water vapor is unnecessary and meaningless. The water vapor content in the inert gas atmosphere is preferably 2 to 8 $g/m^3$. The oxygen content in the inert gas atmosphere is preferably 0.1 to 5% by volume. It is preferred that the oxygen content in the inert gas atmosphere is gradually increased until reaching the aimed value. The inert gas contained in the above inert gas atmosphere is preferably nitrogen gas, helium gas, argon gas or the like. Among these inert gases, nitrogen gas is more preferred.

The reaction temperature used in the fourth step of the present invention is usually 40 to 160° C., preferably 40 to 140° C. Meanwhile, it is preferred that the reaction temperature used in the fourth step is lower than the surface-oxidation temperature used in the second step. When the reaction temperature used in the fourth step is less than 40° C., it may be difficult to form a satisfactory surface-oxidation layer. When the reaction temperature used in the fourth step is more than 160° C., the thickness of the surface-oxidation layer may be too large, resulting in deterioration in saturation magnetization value of the obtained particles.

The point of the present invention is that by using spindle-shaped magnetic alloy particles containing Fe and Co and having a specific crystallite size and a specific activation volume, it is possible to produce a magnetic recording medium having a less noise.

In the above production process of the present invention, the activation volume and the crystallite size of the particles can be controlled to small values by the reduction reaction and surface-oxidation of the first and second steps, and further a dense surface-oxidation layer can be formed by the reduction reaction and surface-oxidation of the third and fourth steps while minimizing the activation volume and the growth of crystallite size. As a result, it is considered by the present inventors that all of requirements including a high coercive force and a small rotational hysteresis integral value as well as a small crystallite size and a small activation volume can be achieved.

In addition, in the present invention, since the activation volume and the crystallite size are controlled to small values, it is possible to reduce the noise. In addition, the small rotational hysteresis integral value causes reduction in width of magnetization reversal, thereby approaching the magnetization reversal mode to coherent rotation. Further, since the spindle-shaped magnetic alloy particles of the present invention are fine particles having a high coercive force and a large anisotropy field, it is possible to obtain a high output performance.

Thus, since the spindle-shaped magnetic alloy particles of the present invention can satisfy various properties as described above, the magnetic recording medium using the spindle-shaped magnetic alloy particles according to the present invention can exhibit not only an excellent output characteristics in a short wavelength region and a considerably reduced noise, but also a small width of magnetization reversal. In addition, the spindle-shaped magnetic alloy particles produced by the above production process according to the present invention are free from sintering therebetween and can be provided thereon with a dense surface-oxidation layer, resulting in excellent dispersibility and oxidation stability. Also, the magnetic recording medium using the spindle-shaped magnetic alloy particles of the present invention is excellent in surface smoothness and long-term storage stability.

The spindle-shaped magnetic alloy particles of the present invention are small in major axis diameter, activation volume and crystallite size, and can exhibit a high coercive force, an excellent oxidation stability and a small rotational hysteresis integral value. Therefore, by using such spindle-shaped magnetic alloy particles, it is possible to produce a high-density magnetic recording medium having a high output performance and a less noise.

Thus, the magnetic recording medium produced using the spindle-shaped magnetic alloy particles of the present invention can be suitably used as a digital magnetic recording medium exhibiting a high-density recording property, high output characteristics and a less noise.

EXAMPLES

The present invention is described in more detail by Examples and Comparative Examples, but the Examples are only illustrative and, therefore, not intended to limit the scope of the present invention thereto.

Various properties were measured by the following methods.

(1) The average major axis diameter, average minor axis diameter and aspect ratio of spindle-shaped goethite particles, spindle-hematite particles and spindle-shaped magnetic alloy particles are respectively expressed by averages of values measured by an electron microscope.

(2) The amounts of Co, Al, rare earth elements and other metal elements contained in spindle-shaped goethite particles, spindle-hematite particles and spindle-shaped magnetic alloy particles were measured using an inductively coupled high-frequency plasma atomic emission spectroscope (SPS-4000 Model, manufactured by Seiko Denshi Kogyo Co., Ltd.).

(3) The BET specific surface areas of the respective particles are expressed by the values measured by a BET method using "Monosorb MS-11" (manufactured by Cantachrom Co., Ltd.).

(4) The crystallite size $D_{110}$ (X-ray crystallite size of spindle-shaped magnetic alloy particles) is expressed by the thickness of the crystallite as measured in the direction perpendicular to each crystal plane (110) of the spindle-shaped magnetic alloy particles by an X-ray diffraction method using an X-ray diffractometer manufactured by Rigaku Co., Ltd. (measuring conditions: target: Cu; X-ray tube voltage: 40 kV; X-ray tube current: 40 mA). The value was calculated on the basis of the X-ray diffraction peak curve prepared with respect to the respective crystal planes, from the following Scherrer's formula:

$$D_{110} = k\lambda/\beta \cos\theta$$

wherein β is a true half-value width of the diffraction peak which was corrected with respect to the width of machine used (unit: radian); K is a Scherrer constant (=0.9); λ is a wavelength of X-ray used (Cu Kα-ray 0.1542 nm); and θ is a diffraction angle (corresponding to a diffraction peak of the crystal plane (110)).

(5) The magnetic properties of spindle-shaped magnetic alloy particles were measured using a vibration sample magnetometer "VSM-3S-15" (manufactured by Toei Kogyo Co., Ltd.) by applying an external magnetic field of 795.8 kA/m (10 kOe) thereto.

(6) The changing percentage (Δσs) of saturation magnetization of particles for evaluating an oxidation stability of the particles (hereinafter referred to merely "oxidation stability of saturation magnetization"), and the changing percentage (ΔBm) of saturation magnetic flux density Bm of a magnetic coating film for evaluating a weather resistance (oxidation stability) of the coating film (hereinafter referred to merely "oxidation stability of saturation magnetic flux density"), were measured as follows.

That is, the particles and the magnetic coating film were allowed to stand in a constant-temperature oven maintained at 60° C. and a relative humidity of 90% for one week to conduct an accelerated deterioration test. Thereafter, the particles and the magnetic coating film were measured to determine the saturation magnetization value and saturation magnetic flux density, respectively. The oxidation stability of saturation magnetization (Δσs) was calculated by dividing the difference (absolute value) between the values σs and σs' measured before and after the one-week accelerated test, respectively, by the value σs measured before the accelerated test, and the oxidation stability of saturation magnetic flux density (ΔBm) was calculated by dividing the difference (absolute value) between the values Bm and Bm' measured before and after the one-week accelerated test, respectively, by the value Bm measured before the accelerated test. The closer to zero the oxidation stability of saturation magnetization (Δσs) and oxidation stability of saturation magnetic flux density (ΔBm), the more excellent the oxidation stability of the particles and the magnetic coating film.

(7) The rotational hysteresis integral value Rh and anisotropy field Hk of the spindle-shaped magnetic alloy particles were measured using a torque-type magnetometer manufactured by Digital Measurement Systems Co., Ltd. by the following method.

That is, first, demagnetized spindle-shaped magnetic alloy particles were enclosed in a capsule and applied with an external magnetic field. The external magnetic field applied to the particles was varied from 19.9 kA/m (250 Oe) to 795.8 kA/m (10 kOe) at intervals of 19.9 kA/m (250 Oe) while reciprocating a rotation angle of the magnetic field from 0° to 360° and further back to 0° at intervals of 563°, thereby measuring a hysteresis loss Wr of magnetic torque at the respective magnetic fields. The measured hysteresis loss values Wr were plotted with respect to the inverse number of the magnetic field applied (1/H). On the basis of the plotted curve, the rotational hysteresis integral value Rh was obtained from the following formula:

$$Rh = \int (Wr/Ms) d(1/H)$$

wherein Ms represents a saturation magnetization value (emu/cm$^3$).

Further, the anisotropy field Hk was determined by reading the value of a crossing point between a maximum-gradient tangent line of the Wr-1/H curve drawn on a higher magnetic field side of the curve, and the axis for the inverse number of the magnetic field applied (1/H).

(8) The activation volume $V_{act}$ of spindle-shaped magnetic alloy particles was measured using a vibration sample magnetometer (manufactured by Toei Kogyo Co., Ltd.) by the following method.

That is, first, spindle-shaped magnetic alloy particles were enclosed in a capsule, and magnetized by applying an external magnetic field of 795.8 kA/m (10 kOe) thereto. Then, at 300 K, the magnetic field applied was varied along the demagnetization curve from 200 Oe to 3,600 Oe at intervals of 200 Oe, and maintained at each value to measure the change in magnetization due to thermal oscillation magnetic after-effect for 1,000 seconds. The thus measured value was determined as an amount of magnetization attenuated ($\Delta M$). Immediately after the measurement, the magnetic field applied was increased by 200 Oe at which the amount of magnetization attenuated was similarly measured. Then, the magnetic field applied was decreased by 200 Oe to measure a reversible magnetic susceptibility $\chi^{rev}$. The total differential magnetic susceptibility $\chi^{tot}$ was obtained by dividing a difference in magnetization value obtained when the change in magnetization with time after 1,000 seconds became small, by 200 Oe.

The irreversible magnetic susceptibility $\chi^{irr}$ in the range of 200 Oe to 3,600 Oe, was obtained by subtracting the reversible magnetic susceptibility $\chi^{rev}$ from the total differential magnetic susceptibility $\chi^{tot}$. Since the activation volume of the spindle-shaped magnetic alloy particles showed a moderate magnetic field-dependency, the coercive force Hc was used as its typical value.

Then, the activation volume $V_{act}$ was calculated from the following formulae (1) and (2):

$$Sv = \Delta M / (\chi^{irr} \cdot \ln t) \quad (1)$$

$$V_{act} = kB \cdot T / Ms \cdot Sv \quad (2)$$

wherein kB represents a Boltzmann's constant; and Sv represents a magnetic after-effect constant.

(9) The true density of the spindle-shaped magnetic alloy particles was measured by a constant-volume expansion method using a Multi-Volume Densitometer 1305 manufactured by Micro Meritecs Co., Ltd.

(10) Production of magnetic tape:

Next, the preparation and application of a coating material were performed by the following method, thereby producing a magnetic tape.

| Composition of coating material: | |
|---|---|
| Spindle-shaped magnetic alloy particles | 100 parts by weight |
| <Binder> | |
| Vinyl chloride-based copolymer resin (tradename: MR104 produced by Nippon Zeon Co., Ltd.) | 10 parts by weight |
| Polyurethane resin (tradename: UR-8200 produced by Toyobo Co., Ltd.) | 10 parts by weight |
| α-alumina (tradename: AKP-50 produced by Sumitomo Kagaku Co., Ltd.) | 10 parts by weight |
| Carbon black (tradename: 3250 produced by Mitsubishi Kagaku Co., Ltd.) | 3 parts by weight |
| <Lubricant> | |
| Myristic acid | 1 part by weight |
| Butyl stearate | 2 parts by weight |
| <Curing agent> | |
| Isocyanate-based curing agent (tradename: E-31 produced by Takeda Yakuhin Co., Ltd.) | 5 parts by weight |
| <Solvent> | |
| Methyl ethyl ketone | 114 parts by weight |
| Toluene | 68 parts by weight |
| Cyclohexanone | 46 parts by weight |

Method of Forming a Coating Material:

The above magnetic alloy particles, vinyl chloride-based copolymer resin, α-alumina, carbon black and solvent were mixed together, kneaded by a pressure kneader, and then diluted with the solvent. Further, the urethane-based copolymer resin was added to the mixture, and dispersed by a sand mill. The resultant dispersion was mixed with the lubricant and solvent to control a solid content thereof to an adequate level, and then passed through a filter. Before coating, the thus obtained material was mixed with the curing agent under stirring, thereby preparing a magnetic coating material.

Coating Method:

The obtained magnetic coating material was applied onto a 7 μm-thick polyethylene terephthalate film to form a magnetic layer having a thickness of 1.2 μm upon drying thereon. The thus obtained magnetic layer was oriented by a solenoid magnet, dried, surface-smoothened by calendering, and then cured.

Successively, a coating material for back coat containing carbon black, vinyl chloride-based copolymer resin and polyurethane-based resin was applied onto the back side of the polyethylene terephthalate film opposite to the side where the magnetic layer was formed, and then dried to form a back coat layer. The obtained coated film was slit into 8 mm width, thereby producing a magnetic tape.

The thus obtained magnetic tape was subjected to measurements of magnetostatic properties, surface roughness and electromagnetic performance by the following methods.

(11) The magnetic properties of the magnetic tape were measured using a vibration sample magnetometer "VSM-3S-15" (manufactured by Toei Kogyo Co., Ltd.) by applying an external magnetic field of 795.8 kA/m (10 kOe) thereto.

(12) The surface roughness Ra of the magnetic tape was determined by measuring a center line average roughness thereof using a stylus-type surface roughness tester (Model: Surfcom-575A manufactured by Tokyo Seimitsu Co., Ltd.).

(13) The electromagnetic performance of the magnetic tape was measured using a fixed head-type electromagnetometer (Model: Drum Tester BX-3168 manufactured by Belbex Co., Ltd.). Specifically, the magnetic tape was wound around a drum. While rotating the drum such that the relative speed between the magnetic tape and a head was 3.3 m/second, 10 kHz short-wavelength signals were recorded on the magnetic tape at its optimum recording current, and the 10 kHz output level was measured by a spectrum analyzer. Then, the 9 kHz noise level (recording frequency: 1 kHz) was measured, and the C/N ratio was determined as the difference between the 10 kHz output level and the 9 kHz noise level. Meanwhile, the output level and the C/N level were expressed by absolute values (dB) relative to those of a reference tape. As the reference tape, there was used the tape obtained in Comparative Example 1.

Example 1
<Production of Spindle-Shaped Goethite Particles>

30 liters of an aqueous mixed alkali solution containing ammonium hydrogen carbonate and aqueous ammonia in amounts of 30 mol and 45 mol, respectively, was charged into a reactor equipped with a stirrer having bubble dispersion blades. While rotating the stirrer at 600 rpm, a nitrogen gas was passed through the reactor at a flow rate of 60 liters/minute, and the temperature within the reactor was controlled to 50° C. Then, 16 liters of an aqueous ferrous sulfate solution containing 20 mol of $Fe^{2+}$ (concentration of the aqueous mixed alkali solution: 1.875 equivalents (calculated as normality) based on ferrous sulfate) was charged into the bubble tower, and the contents of the bubble tower were aged therein for 25 minutes. Thereafter, 4 liters of an aqueous cobalt sulfate solution containing 4.0 mol of $Co^{2+}$ (equivalent to 20 atm % (calculated as Co) based on whole Fe) was added to the bubble tower, and the contents of the bubble tower were further aged for 3 hours. After aging, air was passed through the bubble tower at a flow rate of 2 liters/minute to conduct the oxidation reaction until the oxidation percentage of $Fe^{2+}$ in total reached 30%.

Then, one liter of an aqueous aluminum sulfate solution containing 1.6 mol of $Al^{3+}$ (equivalent to 8 atm % (calculated as Al) based on whole Fe) was added to the reaction solution, and the oxidation reaction was further continued until completed. It was confirmed that the pH value of the reaction solution upon completion of the reaction was 7.63.

The thus obtained goethite particles were filtered out from the resultant slurry using a filter press, washed with aqueous ammonia whose pH value was adjusted to 10.5 using ammonia, and then further washed with ion-exchanged water, thereby obtaining a press cake.

A part of the obtained press cake was dried and pulverized by ordinary methods, thereby obtaining spindle-shaped goethite particles. It was confirmed that the obtained spindle-shaped goethite particles exhibited an average major axis diameter of 0.11 μm, an average minor axis diameter of 0.019 μm, an aspect ratio of 5.8:1, a size distribution (standard deviation/average major axis diameter) of 0.16, a BET specific surface area value of 192 $m^2$/g, and had as whole particles, a Co content of 19.8 atm % based on whole Fe, and an Al content of 8 atm % based on whole Fe.

<Production of Spindle-Shaped Hematite Particles>

The press cake containing the spindle-shaped goethite particles obtained above was sufficiently dispersed in water. An aqueous yttrium nitrate solution containing 11 atm % of Y based on whole Fe, and an aqueous cobalt acetate solution containing 23 atm % of Co based on whole Fe, were added to the dispersion, and then stirred sufficiently. Then, while stirring, an aqueous ammonium hydrogen carbonate solution was added to the mixture to control the pH value thereof to 7.2. Thereafter, the mixture was filtered and then washed using a filter press, thereby obtaining a press cake. The obtained press cake was extruded by using a molding having holes of 3 mm, and then dried at 120° C., thereby obtaining a granulated product of spindle-shaped goethite particles coated with an yttrium compound and a cobalt compound. It was confirmed that the thus obtained spindle-shaped goethite particles had a Co content of 37 atm % based on whole Fe; an Al content of 8 atm % based on whole Fe; and a Y content of 11 atm % based on whole Fe.

The thus obtained granulated product of spindle-shaped goethite particles coated with the yttrium and cobalt compounds was dehydrated in air at 300° C., and then heat-dehydrated in air at 600° C., thereby obtaining a granulated product of spindle-shaped hematite particles <Production of Spindle-Shaped Magnetic Alloy Particles>

100 g of the obtained granulated product of spindle-shaped hematite particles having an average particle size of 2.6 mm were charged into a batch-type fixed bed reducing apparatus having an inner diameter of 72 mm to form a fixed bed of the particles having a height of 5.5 cm. Then, the fixed bed was heated to 400° C. while passing a nitrogen gas through the reducing apparatus at a superficial velocity of 50 cm/second. Then, the nitrogen gas was switched to a hydrogen gas, and while passing the hydrogen gas through the reducing apparatus at a superficial velocity of 50 cm/second, the fixed bed was heat-reduced at 400° C. until the dew point of gas discharged therefrom reached −30° C., thereby obtaining spindle-shaped magnetic alloy particles (first step).

Thereafter, the hydrogen gas was switched again to nitrogen gas, and the obtained spindle-shaped magnetic alloy particles were cooled to 80° C., and maintained at that temperature. Then, air was mixed with the nitrogen gas so as to gradually increase the concentration of oxygen contained in the mixed gas to 0.35% by volume, and the spindle-shaped magnetic alloy particles were subjected to surface oxidation until the temperature thereof reached a retention temperature plus 1° C. (maximum product temperature: 140° C.; treating time: 2 hours), thereby forming a surface-oxidation layer on the surface of the particles (second step).

It was confirmed that the spindle-shaped magnetic alloy particles obtained after completion of the second step, had a saturation magnetization value of 108.1 $Am^2$/kg (108.1 emu/g). Then, the spindle-shaped magnetic alloy particles were heated to 500° C. in an inert gas atmosphere. Then, the atmosphere was switched to a hydrogen gas, and while flowing the hydrogen gas at a superficial velocity of 60 cm/second, the spindle-shaped magnetic alloy particles were heat-reduced again until the dew point of gas discharged therefrom reached −30° C. (third step).

Thereafter, the hydrogen gas was switched again to nitrogen gas, and the spindle-shaped magnetic alloy particles were cooled to 50° C., and maintained at that temperature. Then, water vapor in an amount of 6 g/$m^3$ and air were mixed with the nitrogen gas, and while gradually increasing the concentration of oxygen contained in the mixed gas to 0.35% by volume, the spindle-shaped magnetic alloy particles was subjected to surface oxidation until the temperature thereof reached a retention temperature plus 1° C. (maximum product temperature: 110° C.; treating time: 1.25 hours), thereby forming a stable surface-oxidation layer on the surface of the particles and obtaining a granulated product of spindle-shaped magnetic alloy particles (fourth step).

It was confirmed that the obtained spindle-shaped magnetic alloy particles had an average major axis diameter of 0.073 μm, an average minor axis diameter of 0.017 μm, an average particle volume of 0.166×10E-4 μ$m^3$, a BET specific surface area value of 61.3 $m^2$/g, and a crystallite size $D_{110}$ of 134 Å. Further, it was confirmed that the obtained spindle-shaped magnetic alloy particles exhibited a uniform particle size, contained no dendritic particles, and had a Co content of 37 atm % based on whole Fe, an Al content of 8 atm % based on whole Fe and a Y content of 11 atm % based on whole Fe.

As to the magnetic properties of the obtained spindle-shaped magnetic alloy particles, it was confirmed that the coercive force Hc thereof was 187.1 kA/m (2,351 Oe); the saturation magnetization value σs thereof was 130.0 $Am^2$/kg (130.0 emu/g); the squareness (σr/σs) thereof was 0.543; the oxidation stability Δσs of saturation magnetization thereof was 7.5% as an absolute value (actual measured value: −7.5%); and a true density thereof was 5.8 g/$cm^3$. Further, it was confirmed that the obtained spindle-shaped magnetic alloy particles exhibited a rotational hysteresis integral value Rh of 0.79 and an anisotropy field Hk of 536 kA/m (6,730 Oe).

Also, it was confirmed that the obtained spindle-shaped magnetic alloy particles had an activation volume $V_{act}$ of 0.043×10E-4 μ$m^3$.

Further, as to the magnetic properties of the magnetic tape produced using the above obtained spindle-shaped magnetic alloy particles, it was confirmed that the coercive force Hc of the magnetic tape was 195.4 kA/m (2,456 Oe); the squareness (Br/Bm) thereof was 0.876; the orientation degree OR thereof was 2.81; the SFD thereof was 0.351; the surface roughness Ra thereof was 3.3 nm; and the oxidation stability ΔBm thereof was 3.8% as an absolute value (actual measured value: −3.8%).

In addition, as to the electromagnetic performance of the obtained magnetic tape, it was confirmed that the 10 KHz output level thereof was +2.8 dB; and the C/N level thereof was +5.7 dB. Also, it was confirmed that the 10 kHz reproduction signal waveform was sharp, and the half value width of the reproduction signals was small as compared to that obtained in Comparative Example 1.

<Production of Goethite Particles>

Goethite Particles 1 to 5:

Goethite particles 1 to 5 having properties as shown in Table 1 were prepared as starting particles.

Meanwhile, the goethite particles 1 and 4 were produced by the same method as defined in Example 1 except that rotating speed of stirrer, aging time and amount of air passed were varied.

The goethite particles 2 were produced by the following method.

30 liters of an aqueous mixed alkali solution containing sodium carbonate and sodium hydroxide in amounts of 25 mol and 20 mol, respectively (concentration of sodium hydroxide: 28.6 mol % (calculated as normality) based on mixed alkali) were charged into a bubble tower, and the temperature within the bubble tower was adjusted to 47° C. while passing a nitrogen gas therethrough at a flow rate of 50 liters/minute. Then, 20 liters of an aqueous ferrous sulfate solution containing 20 mol of $Fe^{2+}$ (concentration of the mixed aqueous alkali solution: 1.75 equivalents (calculated as normality) based on ferrous sulfate) were charged into the bubble tower, and the contents of the bubble tower were aged therein for 30 minutes. Thereafter, 4 liters of an aqueous cobalt sulfate solution containing 4.0 mol of $Co^{2+}$ (equivalent to 20 atm % (calculated as Co) based on whole Fe) was added to the bubble tower, and the contents of the bubble tower were further aged for 4 hours and 30 minutes. After aging, air was passed through the bubble tower at a flow rate of 90 liters/minute to conduct the oxidation reaction until the oxidation percentage of $Fe^{2+}$ in total reached 40%.

Then, one liter of an aqueous aluminum sulfate solution containing 2.4 mol of $Al^{3+}$ (equivalent to 12.0 atm % (calculated as Al) based on whole Fe) was added to conduct the oxidation reaction, and the reaction mixture was washed with ion-exchanged water using a filter press, thereby obtaining a press cake.

A part of the obtained press cake was dried and pulverized by ordinary methods, thereby obtaining spindle-shaped goethite particles. It was confirmed that the obtained goethite particles had an average major axis diameter of 0.109 μm, an average minor axis diameter of 0.0160 μm, an aspect ratio of 7.0:1, a size distribution (standard deviation/average major axis diameter) of 0.19, and a BET specific surface area of 181 $m^2$/g. In addition, it was confirmed that the obtained goethite particles had as whole particles, a Co content of 20.0 atm % based on whole Fe, and an Al content of 12 atm % based on whole Fe.

The goethite particles 3 were produced by the same method as used for producing the above goethite particles 2 except that addition timing of Co, amount of air passed and amount of Al compound added were varied.

The goethite particles 5 were produced by the same method as defined in Example 1 except that addition timing of Co, amount of air passed, rotating speed of stirrer, and amounts of cobalt sulfate and yttrium nitrate added were varied.

<Production of Hematite Particles>

Hematite Particles 1 to 5:

Hematite particles 1 to 5 were produced using the above goethite particles 1 to 5. Various properties of the obtained hematite particles are shown in Table 2. Meanwhile, the hematite particles 1 were produced by the same method as defined in Example 1 except that the goethite particles 1 were used. The hematite particles 2 were produced by the following method.

Then, the press cake containing the obtained spindle-shaped goethite particles was sufficiently dispersed in water. An aqueous yttrium nitrate solution (yttrium content: 8 atm % (calculated as Y) based on whole Fe) and an aqueous cobalt sulfate solution (cobalt content: 8 atm % (calculated as Co) based on whole Fe) were added to the dispersion, and then intimately stirred. Further, while stirring, an aqueous sodium carbonate solution was added to the dispersion so as to adjust the pH thereof to 9.5. Thereafter, the dispersion was filtered and washed with water using a filter press, thereby obtaining a press cake. The obtained press cake was extruded by using a molding having holes of 3 mm, and the resultant granulated product was dried at 120° C., thereby obtaining a granulated product of spindle-shaped goethite particles coated with the yttrium compound and the cobalt compound. It was confirmed that the thus obtained spindle-shaped goethite particles had a Co content of 28 atm % based on whole Fe, an Al content of 12 atm % based on whole Fe, and a Y content of 8 atm % based on whole Fe.

Then, the obtained molded product of the spindle-shaped goethite particles coated with the above yttrium and cobalt compounds were dehydrated in air at 300° C., and then heat-dehydrated in air at 600° C., thereby obtaining a molded product of spindle-shaped hematite particles.

As a result, it was confirmed that the obtained spindle-shaped hematite particles had a Co content of 28 atm % based on whole Fe; an Al content of 12 atm % based on whole Fe; and a Y content of 8 atm % based on whole Fe.

The hematite particles 3 to 5 were produced by the same method as defined in Example 1 except that the above goethite particles 3 to 5 are respectively used.

Examples 2 to 4 and Comparative Examples 1 and 2

<Production of Spindle-Shaped Magnetic Alloy Particles Containing Fe and Co as Main Components>

The same procedure as defined in Example 1 was conducted except that kinds of hematite particles and respective production conditions of the first to fourth steps were changed variously, thereby obtaining spindle-shaped magnetic alloy particles.

Main production conditions are shown in Table 3, and various properties of the obtained spindle-shaped magnetic alloy particles are shown in Tables 4 and 5.

<Production of Magnetic Tape>

Then, magnetic tapes were produced by the same method as defined in Example 1 except that respective spindle-shaped magnetic alloy particles as shown in Tables 4 and 5 were used. Various properties and electromagnetic performance of the obtained magnetic tapes are shown in Table 6.

Meanwhile, the magnetic tape obtained in Example 4 was produced by applying simultaneously a magnetic coating material prepared by using the spindle-shaped magnetic alloy particles obtained in Example 4 by the same procedure as defined in Example 1 and a non-magnetic coating material prepared by the below-mentioned method, onto a by the below-mentioned coating method, so as to from a magnetic tape: magnetic layer/non-magnetic undercoat layer/polyethylene terephthalate film.

Composition of non-coating material:

| | |
|---|---|
| Acicular non-magnetic hematite particles (major axis diameter: 0.16 μm; minor axis diameter: 0.026 μm; aspect ratio: 6.2:1; BET specific surface area: 49.1 m²/g; Al content: 3.5 wt. %) | 100 parts by weight |

<Binder>

| | |
|---|---|
| Vinyl chloride-based copolymer resin (tradename: MR104 produced by Nippon Zeon Co., Ltd.) | 7.5 parts by weight |
| Polyurethane resin (tradename: UR-8200 produced by Toyobo Co., Ltd.) | 7.5 parts by weight |

<Lubricant>

| | |
|---|---|
| Myristic acid | 2.5 part by weight |
| Butyl stearate | 2.5 parts by weight |

<Curing agent>

| | |
|---|---|
| Isocyanate-based curing agent (tradename: E-31 produced by Takeda Yakuhin Co., Ltd.) | 5 parts by weight |

<Solvent>

| | |
|---|---|
| Methyl ethyl ketone | 93 parts by weight |
| Toluene | 55 parts by weight |
| Cyclohexanone | 36 parts by weight |

Method of Forming a Non-Magnetic Coating Material:

The above non-magnetic particles, vinyl chloride-based copolymer resin and solvent were mixed together, kneaded by a pressure kneader, and then diluted with the solvent. Further, the urethane-based copolymer resin was added to the mixture, and dispersed by a sand mill. The resultant dispersion was mixed with the lubricant and solvent to control a solid content thereof to an adequate level, and then passed through a filter. Before coating, the thus obtained coating material was mixed with the curing agent under stirring, thereby preparing a non-magnetic coating material.

Coating Method:

The above-prepared non-magnetic coating material and magnetic coating material were sequently applied onto a 7 μm-thick polyethylene terephthalate film to form a non-magnetic undercoat layer and then a magnetic layer having thicknesses of 1.1 μm and 0.15 μm (upon drying), respectively, thereon. The thus obtained coating film was magnetically oriented by a solenoid magnet, dried, surface-smoothened by calendering, and then cured.

Successively, a coating material for back coat containing carbon black, vinyl chloride-based copolymer resin and polyurethane-based resin was applied onto the back side of the polyethylene terephthalate film opposite to the side where the non-magnetic and magnetic layers were formed, and then dried to form a back coat layer. The obtained film was slit into 8 mm width, thereby producing a magnetic tape.

TABLE 1

| | Properties of goethite particles | | | |
|---|---|---|---|---|
| Goethite particles | Shape | Average major axis diameter (μm) | Average minor axis diameter (μm) | Aspect ratio (-) |
| Goethite particles 1 | Spindle-shaped | 0.129 | 0.020 | 6.5:1 |
| Goethite particles 2 | Spindle-shaped | 0.109 | 0.016 | 7.0:1 |
| Goethite particles 3 | Spindle-shaped | 0.131 | 0.019 | 6.9:1 |
| Goethite particles 4 | Spindle-shaped | 0.150 | 0.022 | 6.8:1 |
| Goethite particles 5 | Spindle-shaped | 0.082 | 0.012 | 6.8:1 |

TABLE 1-continued

| | Properties of goethite particles | | | |
|---|---|---|---|---|
| Goethite particles | Size distribution (s/l) | BET specific surface area value (m²/g) | Co/Fe (atm %) | Al/Fe (atm %) |
| Goethite particles 1 | 0.18 | 177 | 19.8 | 8 |
| Goethite particles 2 | 0.19 | 181 | 20.0 | 12 |
| Goethite particles 3 | 0.19 | 174 | 20.0 | 8 |
| Goethite particles 4 | 0.20 | 169 | 19.9 | 8 |
| Goethite particles 5 | 0.19 | 197 | 20.0 | 8 |

TABLE 2

| Hematite particles | Goethite particles used | Properties of hematite particles Shape |
|---|---|---|
| Hematite particles 1 | Goethite particles 1 | Spindle-shaped |
| Hematite particles 2 | Goethite particles 2 | Spindle-shaped |
| Hematite particles 3 | Goethite particles 3 | Spindle-shaped |
| Hematite particles 4 | Goethite particles 4 | Spindle-shaped |
| Hematite particles 5 | Goethite particles 5 | Spindle-shaped |

| | Properties of hematite particles | | |
|---|---|---|---|
| Hematite particles | Co/Fe (atm %) | Al/Fe (atm %) | Y/Fe (atm %) |
| Hematite particles 1 | 32 | 8 | 13 |
| Hematite particles 2 | 28 | 12 | 8 |
| Hematite particles 3 | 32 | 8 | 8 |
| Hematite particles 4 | 32 | 8 | 8 |
| Hematite particles 5 | 41 | 8 | 14 |

TABLE 3

| Examples and Comparative Examples | Production conditions | |
|---|---|---|
| | Kind of starting particles | First step Reducing temperature (° C.) |
| Example 2 | Hematite particles 1 | 400 |
| Example 3 | Hematite particles 2 | 400 |
| Example 4 | Hematite particles 5 | 350 |
| Comparative Example 1 | Hematite particles 3 | 575 |
| Comparative Example 2 | Hematite particles 4 | 450 |

TABLE 3-continued

| Examples and Comparative Examples | Production conditions Second step | | |
|---|---|---|---|
| | Oxidation temperature (° C.) | Time (hr) | σs (Am²/kg) |
| Example 2 | 80 | 2 | 115.2 |
| Example 3 | 80 | 2 | 103.1 |
| Example 4 | 80 | 1.5 | 102.2 |
| Comparative Example 1 | — | — | — |
| Comparative Example 2 | 100 | 2 | 112.1 |

| Examples and Comparative Examples | Production conditions Third step | |
|---|---|---|
| | Reducing temperature (° C.) | Annealing temperature (° C.) |
| Example 2 | 500 | 625 |
| Example 3 | 500 | — |
| Example 4 | 450 | — |
| Comparative Example 1 | — | — |
| Comparative Example 2 | 550 | 625 |

| Examples and Comparative Examples | Production conditions Fourth step | | |
|---|---|---|---|
| | Water vapor (g/m³) | Oxidation temperature (° C.) | Time (hr) |
| Example 2 | 6 | 60 | 1.25 |
| Example 3 | 6 | 60 | 1.25 |
| Example 4 | 8 | 50 | 1.5 |
| Comparative Example 1 | 6 | 60 | 1.25 |
| Comparative Example 2 | 6 | 50 | 1.25 |

TABLE 4

| Examples and Comparative Examples | Properties of spindle-shaped magnetic alloy particles | | | |
|---|---|---|---|---|
| | Shape | Co/Fe (atm %) | Al/Fe (atm %) | Y/Fe (atm %) |
| Example 2 | Spindle-shaped | 32 | 8 | 13 |
| Example 3 | Spindle-shaped | 28 | 12 | 8 |
| Example 4 | Spindle-shaped | 41 | 8 | 14 |
| Comparative Example 1 | Spindle-shaped | 32 | 8 | 8 |
| Comparative Example 2 | Spindle-shaped | 32 | 8 | 8 |

| Examples and Comparative Examples | Properties of spindle-shaped magnetic alloy particles | |
|---|---|---|
| | Average major axis diameter (μm) | Average minor axis diameter (w) (μm) |
| Example 2 | 0.091 | 0.018 |
| Example 3 | 0.073 | 0.014 |
| Example 4 | 0.045 | 0.010 |
| Comparative Example 1 | 0.097 | 0.016 |
| Comparative Example 2 | 0.114 | 0.018 |

| Examples and Comparative Examples | Properties of spindle-shaped magnetic alloy particles | |
|---|---|---|
| | BET specific surface area value (m²/g) | Crystallite size ($D_{110}$) (Å) |
| Example 2 | 57.1 | 155 |
| Example 3 | 64.0 | 137 |
| Example 4 | 71.0 | 104 |
| Comparative Example 1 | 50.1 | 160 |
| Comparative Example 2 | 49.9 | 172 |

TABLE 5

| Examples and Comparative Examples | Properties of spindle-shaped magnetic alloy particles | |
|---|---|---|
| | Activation volume ($V_{act}$) (μm³) | Rotational hysteresis integral (Rh) (kA/m) |
| Example 2 | 0.041E-4 | 0.86 |
| Example 3 | 0.047E-4 | 0.92 |
| Example 4 | 0.049E-4 | 0.89 |
| Comparative Example 1 | 0.075E-4 | 1.11 |
| Comparative Example 2 | 0.080E-4 | 0.98 |

| Examples and Comparative Examples | Properties of spindle-shaped magnetic alloy particles | | | |
|---|---|---|---|---|
| | Coercive force (Hc) | | Anisotropy field (Hk) | |
| | kA/m | Oe | kA/m | Oe |
| Example 2 | 197.8 | 2,486 | 579 | 7,280 |
| Example 3 | 179.3 | 2,253 | 565 | 7,100 |
| Example 4 | 176.1 | 2,213 | 533.2 | 6,700 |
| Comparative Example 1 | 182.2 | 2,290 | 525 | 6,600 |
| Comparative Example 2 | 189.1 | 2,376 | 541 | 6,800 |

| Examples and Comparative Examples | Properties of spindle-shaped magnetic alloy particles | | | |
|---|---|---|---|---|
| | Saturation magnetization value (σs) | | Square-ness (r/s) | Oxidation stability (Δσs) |
| | Am²/kg | emu/g | (—) | (%) |
| Example 2 | 140 | 140 | 0.538 | −6.3 |
| Example 3 | 132 | 132 | 0.528 | −8.2 |
| Example 4 | 110 | 110 | 0.534 | −13 |
| Comparative Example 1 | 134 | 134 | 0.524 | −8.1 |
| Comparative Example 2 | 148 | 148 | 0.539 | −6.8 |

TABLE 6

| | Properties of magnetic tape | | |
|---|---|---|---|
| Examples and Comparative Examples | Coercive force value (Hc) | Squareness (-) | Orientation degree (-) |
| | kA/m | Oe | | |
| Example 2 | 204.2 | 2,566 | 0.878 | 2.78 |
| Example 3 | 181.4 | 2,280 | 0.861 | 2.59 |
| Example 4 | 193.4 | 2,430 | 0.872 | 2.69 |
| Comparative Example 1 | 190.2 | 2,390 | 0.855 | 2.57 |
| Comparative Example 2 | 195.0 | 2,451 | 0.880 | 2.98 |

| | Properties of magnetic tape | | |
|---|---|---|---|
| Examples and Comparative Examples | SFD (-) | Surface roughness (Ra) (nm) | Oxidation stability (ΔBm) (%) |
| Example 2 | 0.397 | 3.5 | −3.4 |
| Example 3 | 0.439 | 3.6 | −4.5 |
| Example 4 | 0.464 | 2.9 | −6.3 |
| Comparative Example 1 | 0.440 | 3.8 | −4.5 |
| Comparative Example 2 | 0.390 | 3.8 | −3.8 |

| Examples and Comparative Examples | Electromagnetic performance | |
|---|---|---|
| | Output (dB) | C/N (dB) |
| Example 2 | +2.9 | +5.4 |
| Example 3 | +0.5 | +2.8 |
| Example 4 | +4.6 | +8.2 |
| Comparative Example 1 | 0.0 | 0.0 |
| Comparative Example 2 | −0.2 | −0.8 |

What is claimed is:

1. Spindle-shaped magnetic alloy particles containing Fe and Co as main components, having a cobalt content of 20 to 50 atm %, calculated as Co, based on whole Fe; an average major axis diameter (L) of 0.03 to 0.10 μm; a coercive force value of 159.2 to 238.7 kA/m (2,000 to 3,000 Oe); a crystallite size of 100 to 160 Å; an activation volume ($V_{act}$) of 0.01 to 0.071E-4 μm³; and a squareness (σr/σs) of 0.52 to 0.55.

2. Spindle-shaped magnetic alloy particles containing Fe and Co as main components according to claim 1, which have a cobalt content of 20 to 45 atm %, calculated as Co, based on whole Fe; an average major axis diameter (L) of 0.03 to 0.08 μm; a coercive force value of 159.2 to 238.7 kA/m (2,000 to 3,000 Oe); a crystallite size of 110 to 160 Å; and an activation volume ($V_{act}$) of 0.015 to 0.07E-4 μm³.

3. Spindle-shaped magnetic alloy particles containing Fe and Co as main components according to claim 1, which further have an average minor axis diameter of 0.008 to 0.020 μm; and an aspect ratio (average major axis diameter/average minor axis diameter) of 3:1 to 8:1.

4. Spindle-shaped magnetic alloy particles containing Fe and Co as main components according to claim 1, which further have a rotational hysteresis integral value (Rh) of not more than 1.0.

5. Spindle-shaped magnetic alloy particles containing Fe and Co as main components according to claim 1, which further have a saturation magnetization value of 100 to 150 Am²/kg; and a rotational hysteresis integral value (Rh) of not more than 1.0.

6. Spindle-shaped magnetic alloy particles containing Fe and Co as main components according to claim 1, which further have a BET specific surface area value of 40 to 75 m²/g.

7. A magnetic recording medium comprising a non-magnetic substrate, and a magnetic layer formed on the non-magnetic substrate, which comprises the spindle-shaped magnetic alloy particles containing Fe and Co as main components as defined in claim 1, and a binder resin.

8. A magnetic recording medium according to claim 7 which has a coercive force value Hc of 159.2 to 238.7 kA/m (2,000 to 3,000 Oe); a squareness (Br/Bm) of not less than 0.82; an orientation degree of not less than 2.0; an oxidation stability (ΔBm) of less than 8%; and a surface roughness Ra of not more than 8 nm.

9. A magnetic recording medium comprising a non-magnetic substrate, and a magnetic layer formed on the non-magnetic substrate which comprises the spindle-shaped magnetic alloy particles containing Fe and Co as main components as defined in claim 1, said magnetic recording medium having a coercive force Hc of 159.2 to 238.7 kA/m (2,000 to 3,000 Oe); a squareness (Br/Bm) of not less than 0.82; an orientation degree of not less than 2.0; an oxidation stability ΔBm of less than 8%; and a surface roughness Ra of not more than 8 nm.

10. A magnetic recording medium comprising a non-magnetic substrate, and a magnetic layer formed on the non-magnetic substrate which comprises a binder resin and spindle-shaped magnetic alloy particles containing Fe and Co as main components as defined in claim 1 which have a cobalt content of 20 to 50 atm %, calculated as Co, based on whole Fe; an average major axis diameter (L) of 0.03 to 0.08 μm; an average minor axis diameter of 0.008 to 0.020 μm; an aspect ratio (average major axis diameter/average minor axis diameter) of 3:1 to 8:1; a coercive force value of 159.2 to 238.7 k/m (2,000 to 3.000 Oe); a crystallite size of 110 to 160 Å; an activation volume ($V_{act}$) of 0.01 to 0.07E-4 μm³; and a squareness (σr/σs) of 0.52 to 0.55, said magnetic recording medium having a coercive force Hc of 159.2 to 238.7 kA/m (2,000 to 3,000 Oe); a squareness (Br/Bm) of not less than 0.82; an orientation degree of not less than 2.0; an oxidation stability ΔBm of less than 8%; and a surface roughness Ra of not more than 8 nm.

11. Spindle-shaped magnetic alloy particles containing Fe and Co as main components, having a cobalt content of 20 to 45 atm %, calculated as Co, based on whole Fe; an average major axis diameter (L) of 0.03 to 0.08 μm; an average minor axis diameter of 0.008 to 0.020 μm; an aspect ratio (average major axis diameter/average minor axis diameter) of 3:1 to 8:1; a coercive force value of 159.2 to 238.7 kA/m (2,000 to 3,000 Oe); a crystallite size of 110 to 160 Å; an activation volume ($V_{act}$) of 0.01 to 0.07E-4 μm³; and a squareness (σr/σs) 0.52 to 0.55.

12. Spindle-shaped magnetic alloy particles containing Fe and Co as main components, having a cobalt content of 20 to 50 atm %, calculated as Co, based on whole Fe; an average major axis diameter (L) of 0.03 to 0.10 μm; an average minor axis diameter of 0.008 to 0.020 μm; an aspect ratio (average major axis diameter/average minor axis diameter) of 3:1 to 8:1; a coercive force value of 159.2 to 238.7 kA/m (2,000 to 3,000 Oe); a crystallite size of 100 to 160 Å; an activation volume ($V_{act}$) of 0.01 to 0.07E-4 μm³; a rotational hysteresis integral value (Rh) of not more than 1.0; and squareness (σr/σs) of 0.52 to 0.55.

13. Spindle-shaped magnetic alloy particles containing Fe and Co as main components, having a cobalt content of 20 to 50 atm %, calculated as Co, based on whole Fe; an average major axis diameter (L) of 0.03 to 0.10 µm; an average minor axis diameter of 0.008 to 0.020 µm; an aspect ratio (average major axis diameter/average minor axis diameter) of 3:1 to 8:1; a coercive force value of 159.2 to 238.7 kA/m (2,000 to 3,000 Oe); a saturation magnetization value of 100 to 150 Am²/kg; a crystallite size of 100 to 160 Å; an activation volume ($V_{act}$) of 0.01 to 0.07E-4 µm³; a rotational hysteresis integral value (Rh) of not more than 1.0; and a squareness (σr/σs) of 0.52 to 0.55.

14. Spindle-shaped magnetic alloy particles containing Fe and Co as main components, having a cobalt content of 20 to 50 atm %, calculated as Co, based on whole Fe; an average major axis diameter (L) of 0.03 to 0.10 µm; a coercive force value of 159.2 to 238.7 kA/m (2,000 to 3,000 Oe); a crystallite size of 100 to 160 Å; an activation volume ($V_{act}$) of 0.01 to 0.07E-4 µm³; and a rotational hysteresis integral value (Rh) of not more than 1.0.

15. Spindle-shaped magnetic alloy particles containing Fe and Co as main components, having a cobalt content of 20 to 45 atm %, calculated as Co, based on whole Fe; an average major axis diameter (L) of 0.03 to 0.08 µm; an average minor axis diameter of 0.008 to 0.020 µm; an aspect ratio (average major axis diameter/average minor axis diameter) of 3:1 to 8:1; a coercive force value of 159.2 to 238.7 kA/m (2,000 to 3,000 Oe); a crystallite size of 110 to 160 Å; and an activation volume ($V_{act}$) of 0.01 to 0.07E-4 µm³; and a rotational hysteresis internal value (Rh) of not more than 1.0.

* * * * *